Patented Feb. 23, 1932

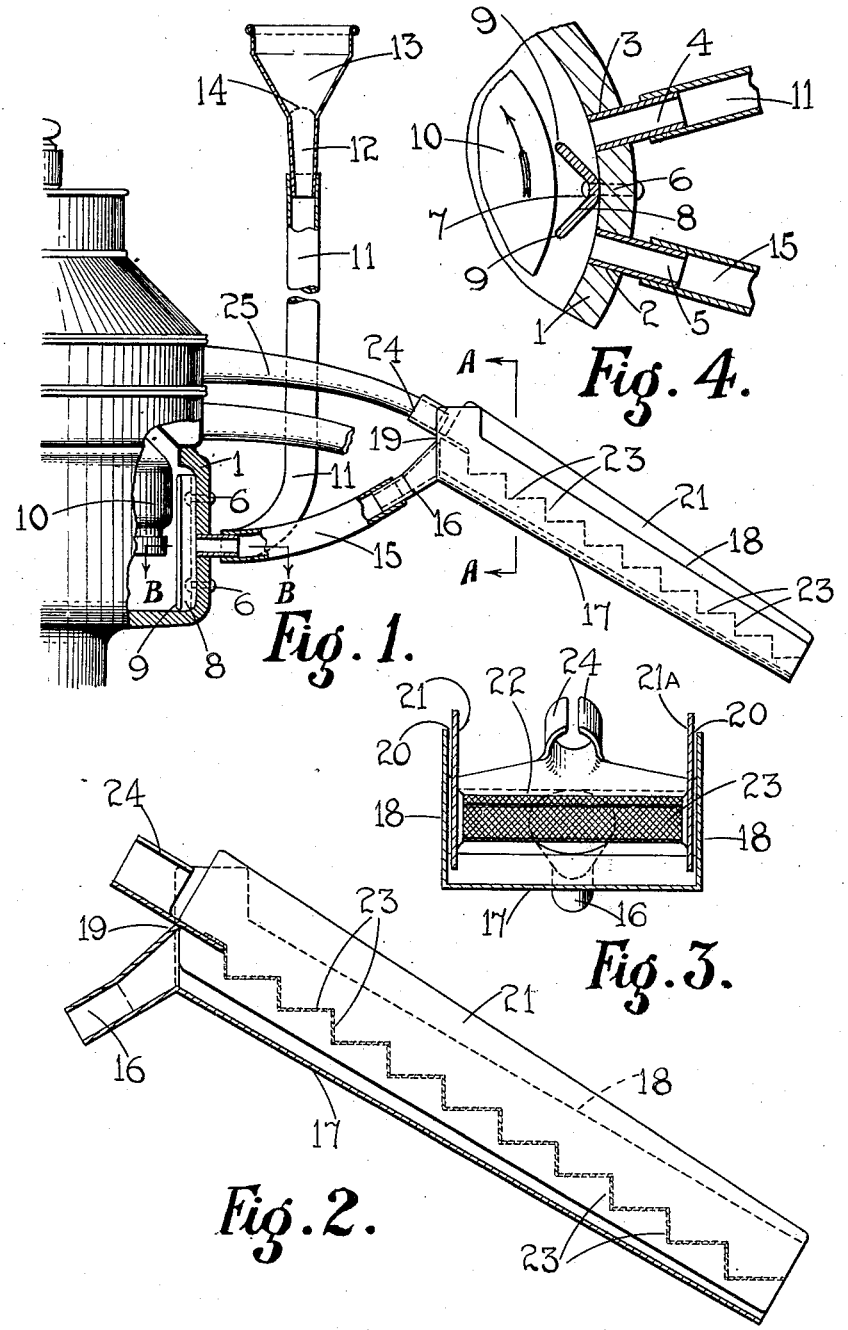

1,846,959

UNITED STATES PATENT OFFICE

WILLIAM GORDON GORDON-JONES, OF PUNAKITERE, BAY OF ISLANDS, NEW ZEALAND

AERATOR AND COOLER FOR MILK, CREAM, OR OTHER LIQUIDS

Application filed November 10, 1930, Serial No. 494,687, and in New Zealand November 15, 1929.

This invention relates to devices for cooling cream, milk or other liquids after being treated by a separator.

Devices for this purpose are known, but they mostly employ water as a cooling medium which under the best conditions only reduces the heat of the milk and cream without removing noxious odours therefrom. Water cooled devices are costly to install and operate and are dependent entirely upon the supply which is often unreliable.

The object of my invention is to provide an improved device of the character specified characterized in that it will simultaneously cool and aerate the milk, cream or other liquids as it leaves the separator, thus removing noxious odours and food flavours from the said fluids.

With this object in view the invention consists in utilizing the suction caused by the revolutions of the bowl of the separator to create and direct a current of air through openings and tubing connected therewith to a trough member provided with a stepped wire gauze channel over which the milk, cream or other liquids is adapted to flow when discharged from the separator.

Accordingly, I provide two holes in the bowl casing of the separator. In these holes I place nipples one of which used as the air inlet is connected by tubing which is led through the wall or roof of the building. The free end of the tubing is provided with a funnel the open end of which is covered by fine wire gauze. A baffle plate is placed inside the bowl casing and is curved so as to lie in close proximity to the perimeter of the bowl of the separator.

The air outlet from the bowl casing of the separator is attached to a tubing which is connected to a trough member, as is also the discharge spouts for the cream.

In the drawings herewith:—

Figure 1 is a side elevation (partly in section) showing the invention attached to a separator head.

Figure 2 is a side sectional elevation of the aerator and cooler unit, and

Figure 3 is a section of the same on the line A—A Figure 1, while,

Figure 4 is an enlarged section of the separator head taken on the line B—B Figure 1.

Any known type of separator may be utilized for the adaptation of my invention. In the drawings 1 represents the separator head in which are drilled two holes 2 and 3 into which holes are secured nipple members 4 and 5. Likewise there are two holes drilled in the separator casing for receiving screws 6 and 7 for retaining a curved baffle plate 8 inside the casing of the separator. The ends 9 of the said baffle plate 8 are preferably in close proximity to the perimeter of the bowl 10 of the separator.

The nipple 4 is connected to one end of a tube 11 which is led out through the wall of a building to a suitable height and at its free end is attached the spout 12 of a funnel 13 which is suitably supported. Over the said funnel 13 is placed a wire gauze member 14 of suitable mesh to keep out dust, insects, and other impurities from the said tube 11. To the nipple 5 there is attached one end of a tube 15 the other end of which is attached to a nipple or spout 16 of a trough member 17 which is preferably turned up at the side 18 to form a channel and a back member 19, the whole construction forming a box.

The open or upper surface 20 of which has fitted into it a further top member consisting of two sides, 21 and 21A provided with a wire gauze stepped bottom 22 which forms a channel 23. The upper end of this wire gauze channel member is provided with a clip 24 integral therewith for the purpose of engaging with the spout 25 of the cream discharge of the separator.

In operation, the high speed of the bowl 10 of the separator causes the air at its periphery to move, taking advantage of this fact and by the introduction of the baffle member 8 into the clearance between the revolving bowl member 10 and the inner surface of the casting of the separator head 1 and thus preventing the continual movement of the air contained in said clearance a partial vacuum will be set up on one side of the baffle and a slight pressure on the other.

On the vacuum side a hole 3 is introduced into the separator head 1 into which is fitted a nipple 4 which in turn is connected by means of tubing 11 to a funnel 13 which as before stated is elevated or open to the atmosphere outside the building. The partial vacuum within the separator head casing draws air through the funnel tubing and hole 3, which air is carried around the bowl 10 of the separator and is trapped at a slight pressure at the other side of the baffle where said air escapes through hole 2, nipple 5 and tubing 15 to the trough member 17. In this member 17 the air escapes through the wire gauze stepping 23 and through the cream flowing over same, thus simultaneously cooling and aerating the said cream, milk or other liquid before it is directed to the container member.

While I have described the air for cooling and aerating the cream, milk or other liquids to be created and directed by the revolutions of the bowl of the separator it will be understood that fans may be employed to supplement said air current if this should be found necessary.

From the foregoing description it will be apparent that there is thus provided a device of the character described possessing the particular features of advantage before enumerated as desirable, but which obviously is susceptible of modification in its form, proportion, detail construction or arrangement of parts, without departing from the principle involved or sacrificing any of its advantages.

Having thus described my invention what I claim as new and desire to secure by Letters Patent is:—

1. A cream separator including a rotating cream separating element, and means utilizing the rotation of said element for drawing into the separator a supply of fresh air and directing such air under pressure for aerating the separated cream.

2. A cream separator including a rotating cream separating element, a casing housing said element, means associated with said casing for utilizing the rotation of said separating element for drawing into the separator a supply of fresh air and directing such air under pressure for aerating the separated cream.

3. A cream separator including a rotating cream separating element, a casing housing said element, said casing being formed with adjacent ports, means secured to the casing between the ports to utilize the rotation of said cream separating element for drawing into the separator a supply of fresh air and directing such air under pressure for aerating the separated cream.

4. A cream separator including a rotating cream separating element, a casing formed with adjacent ports, a baffle plate secured to the casing between the ports, said plate arranged to utilize the rotation of the cream separating element to reduce the pressure at one port and to increase the pressure at the other port, thereby producing a circulation of air about the rotating cream separating element.

WILLIAM GORDON GORDON-JONES.